United States Patent
Lindner

(10) Patent No.: US 10,626,919 B2
(45) Date of Patent: Apr. 21, 2020

(54) COMPOSITE MATERIAL FOR A SLIDING BEARING COMPRISING AN ALUMINUM BEARING METAL LAYER

(71) Applicant: FEDERAL-MOGUL WIESBADEN GMBH, Wiesbaden (DE)

(72) Inventor: Karl-Heinz Lindner, Mulheim (DE)

(73) Assignee: Federal-Mogul Wiesbaden GMBH, Wiesbaden (DE)

(*) Notice: Subject to any disclaimer, the term of this patent is extended or adjusted under 35 U.S.C. 154(b) by 150 days.

(21) Appl. No.: 15/519,364

(22) PCT Filed: Sep. 17, 2015

(86) PCT No.: PCT/EP2015/071328
§ 371 (c)(1),
(2) Date: Apr. 14, 2017

(87) PCT Pub. No.: WO2016/058780
PCT Pub. Date: Apr. 21, 2016

(65) Prior Publication Data
US 2017/0248167 A1  Aug. 31, 2017

(30) Foreign Application Priority Data
Oct. 14, 2014  (DE) .......... 10 2014 220 788

(51) Int. Cl.
*B32B 15/01* (2006.01)
*F16C 33/12* (2006.01)
(Continued)

(52) U.S. Cl.
CPC .......... *F16C 33/121* (2013.01); *B32B 15/012* (2013.01); *C22C 21/00* (2013.01);
(Continued)

(58) Field of Classification Search
None
See application file for complete search history.

(56) References Cited

U.S. PATENT DOCUMENTS 7,942,581 B2 * 5/2011 Leonardelli .............. B05D 5/08
384/129
8,771,838 B2 * 7/2014 Grooteboer ............. C22C 21/14
428/654
(Continued)

FOREIGN PATENT DOCUMENTS

CN  102428196 A  4/2012
CN  103443306 A  12/2013
(Continued)

OTHER PUBLICATIONS

International Alloy Designations and Chemical Composition Limits for Wrought Aluminum and Wrought Aluminum Alloys, The Aluminum Assocation, Arlington, VA, www.aluminum.org, Apr. 2004, XP003023672, pp. 1-12.
(Continued)

Primary Examiner — Daniel J. Schleis
(74) Attorney, Agent, or Firm — Robert L. Stearns; Dickinson Wright, PLLC

(57) ABSTRACT

A sliding-hearing composite material includes a steel supporting layer (10), an intermediate layer (12) based on an aluminum alloy that is free of lead, and a bearing metal layer (14) based on an aluminum alloy that is free of lead, wherein the aluminum alloy of the intermediate layer (12) has a composition having 3.5 to 4.5 wt % copper, 0.1 to 1.5 wt % manganese, 0.1 to 1.5 wt % magnesium, and the usual admissible impurities, the remainder being aluminum, and wherein the aluminum alloy of the bearing mental layer (14) has a composition having wt % tin, 1.0-3.0 wt % nickel, 0.5-1.0 wt % manganese, 0.5-1.0 wt % copper, 0.15-0.25 wt % chromium, 0.1-0.3 wt % vanadium, and the usual admis-
(Continued)

sible impurities, the remainder being aluminum. A sliding bearing element and the use of the sliding-bearing composite material for sliding bearing element, particularly sliding bearing shells, sliding bearing bushes, or thrust washers is also disclosed.

9 Claims, 2 Drawing Sheets

(51) Int. Cl.
| | |
|---|---|
| *F16C 33/20* | (2006.01) |
| *C22C 21/00* | (2006.01) |
| *C22C 21/14* | (2006.01) |
| *C22C 21/16* | (2006.01) |
| *C22C 21/12* | (2006.01) |
| *C22C 21/18* | (2006.01) |

(52) U.S. Cl.
CPC ............ *C22C 21/003* (2013.01); *C22C 21/12* (2013.01); *C22C 21/14* (2013.01); *C22C 21/16* (2013.01); *C22C 21/18* (2013.01); *F16C 33/125* (2013.01); *F16C 33/127* (2013.01); *F16C 33/203* (2013.01); *F16C 2202/04* (2013.01); *F16C 2240/60* (2013.01); *Y10T 428/1275* (2015.01); *Y10T 428/12764* (2015.01)

(56) References Cited

U.S. PATENT DOCUMENTS

| | | |
|---|---|---|
| 2001/0006608 A1 | 7/2001 | McMeekin et al. |
| 2002/0192105 A1 | 12/2002 | Desaki et al. |
| 2004/0247932 A1 | 12/2004 | Kagohara et al. |
| 2009/0025837 A1 | 1/2009 | Neuhaus |
| 2009/0246072 A1* | 10/2009 | Nirasawa ............... C22C 21/003 420/529 |
| 2009/0297392 A1 | 12/2009 | McMeekin et al. |
| 2012/0114273 A1 | 5/2012 | Grootboer et al. |
| 2012/0275731 A1 | 11/2012 | Ziegler et al. |
| 2013/0323524 A1* | 12/2013 | Andler ................. B32B 15/012 428/548 |

FOREIGN PATENT DOCUMENTS

| | | |
|---|---|---|
| CN | 103502665 A | 1/2014 |
| DE | 102004025557 A1 | 1/2005 |
| DE | 102005023541 A1 | 11/2006 |
| DE | 102009002700 B3 | 9/2010 |
| JP | 2001207230 A | 7/2001 |
| JP | 2009542904 A | 12/2009 |
| JP | 2013007395 A | 1/2013 |

OTHER PUBLICATIONS

International Search Report, dated Dec. 15, 2015 (PCT/EP2015/071328).

* cited by examiner

COMPOSITE MATERIAL FOR A SLIDING BEARING COMPRISING AN ALUMINUM BEARING METAL LAYER

BACKGROUND OF THE INVENTION

1. Technical Field

The invention relates to a sliding-bearing composite material, comprising a supporting layer composed of steel, an intermediate layer based on an aluminum alloy that is free of lead except for impurities, and a bearing metal layer based on an aluminum alloy that is free of lead except for impurities and that has tin, nickel, manganese, and copper as main alloying elements.

2. Related Art

Such a sliding-bearing composite material is described, for example, in the documents DE 10 2005 023 541 A1 and DE 10 2009 002 700 B3. The subject matter of the document mentioned first is a sliding-bearing composite material that has a metal supporting layer and a bearing metal layer of the type mentioned above, which bearing metal layer is applied to the metal supporting layer by means of an intermediate layer based on aluminum. The special characteristic in this case is that the aluminum alloys of the intermediate layer and of the bearing metal layer match except for an additional soft-phase fraction in the bearing metal layer. 5-20 wt % tin and especially preferably 9-11 wt % tin are provided as the soft-phase fraction in the bearing metal layer. The remaining alloy constituents of the intermediate layer and the bearing metal layer are 1.0-3.0 wt % nickel, 0.5-2.5 wt % manganese, and 0.02-1.5 wt % copper, the remainder being aluminum.

The second document mentioned above likewise has a sliding bearing element, comprising a supporting layer, an intermediate layer, and a bearing metal layer based on an aluminum alloy, as subject matter. In this case, the special characteristic of the intermediate layer is an aluminum alloy having 3.5-4.5 wt % copper, 0.1-1.5 wt % manganese, and 0.1-1.5 wt % magnesium, wherein the intermediate layer is set to a microhardness of 70 HV 0.01-110 HV 0.01. The bearing metal layer of the sliding bearing element has a composition of 1.0-3 wt % nickel, 0.5-2.5 wt % manganese, 0.02-1.5 wt % copper, and a soft-phase fraction of 5-20 wt %, the remainder being aluminum. Tin, in a fraction of 8-12 wt %, is again preferred as the soft phase. A combination of a relatively thick and relatively hard intermediate layer and the bearing metal layer suitable therefor gives the sliding element a sufficiently plastic compliance and shape adaptability. At the same time, however, the discovered problem of the intermediate layer material being squeezed out at high peak load because of excessive ductility does not arise in this case.

The sliding-bearing composite material of the type in question is also known, for example, from the document DE 10 2004 025 557 A1. This document also concerns the modification of the aluminum-based intermediate layer, which has the special characteristic that said intermediate layer is constructed of at least two plies, of which the lower ply facing the supporting layer composed of steel has a lower hardness than the upper ply facing the aluminum-based bearing metal layer. The composition of the bearing metal layer is specified with a soft-phase fraction of 3 to 20 wt % tin and with 0.1 to 7 wt % of one or more of the elements Cu, Zn, Mg, and Si, 0.01 to 3 wt % of one or more of the elements Mn, V, Mo, Cr, Co, Fe, Ni, and W, 0.01 to 2 wt % of one or more of the elements B, Ti, and Zr, and 3 or less wt % of one or more of the elements Pb, Bi, and In. The composition of the aluminum-based intermediate layer contains, in addition to aluminum, 1 to 8.5 wt % Si, 0.01 to 7 wt % of one or more of the elements Cu, Zn, and Mg, 0.01 to 3 wt % of one or more of the elements Mn, V, Mo, Cr, Co, Fe, Ni, and W, and 0.01 to 2 wt % of one or more of the elements B, Ti, and Zr, the remainder being aluminum.

The document US 2002/0192105 A1 concerns an aluminum alloy for sliding bearings based on aluminum and tin. The alloy has 2 to 20 wt % tin, 3 wt % or less of copper, and 0.3 to 5 wt % TiC particles, the remainder being aluminum. Furthermore, a resin-based coating having $MoSi_2$ solid lubricant for reducing the tendency toward adhesive wear in the run-in phase of the bearing is known from this document.

SUMMARY OF THE INVENTION

To fasten the bearing metal layer on the steel supporting layer, the intermediate layer must be applied in plate form to the bearing metal layer and the composite of bearing metal and intermediate layer must be applied in plate form to the steel supporting layer. The layer composite must then be subjected to a heat treatment, in which the desired microstructure and therefore the desired material properties are set by means of a final annealing process.

Wear resistance is also still an important factor for the mixed friction conditions that predominate in start-stop applications, and therefore there is always a need for optimization here. Furthermore, the inventors have made it an aim to simultaneously increase the fatigue strength of the bearing material.

Accordingly, a sliding-bearing composite material comprises; a supporting layer composed of steel, an intermediate layer based on an aluminum alloy that is free of lead except for impurities, and a bearing metal layer, which is preferably applied directionally to the supporting layer by means of cold-roll plating and which is based on an aluminum alloy that is free of lead except for impurities. The aluminum alloy of the intermediate layer has a composition having 3.5 to 4.5 wt % copper, 0.1 to 1.5 wt % manganese, and 0.1 to 1.5 wt % magnesium, optionally 0.05% to 0.25% zirconium and titanium in total, optionally not more than 0.1 wt % individually and not more than 0.25 wt % in total of other alloy constituents, and the usual admissible impurities, the remainder being aluminum. The aluminum alloy of the bearing metal layer had a composition having wt % tin, 1.0-3.0 wt % nickel, 0.5-1.0 wt % manganese, 0.5-1.0 wt % copper, 0.15-0.25 wt % chromium, 0.1-0.3 wt % vanadium, optionally 0.1-0.2 wt % zirconium, optionally up to 0.2 wt % titanium, optionally less than 0.5 wt % of other elements, and the usual admissible impurities, the remainder being aluminum.

In the sense of this document, "free of lead except for impurities" is understood to mean that a lead fraction, which could be present because of the impurity of individual alloying elements, is less than 0.1 wt % in any case.

The bearing metal is continuously cast in strip form on a belt caster, subsequently tempered, and then plated with the intermediate layer material, which is in the form of a foil. The composite is then rolled and finally applied to the steel on the side of the intermediate layer in a cold-roll plating step. Cold-roll plating refers to a roll plating method at plating temperatures of <300° C. This production method results in a sliding-bearing composite material having a high-strength, fatigue-resistant bearing metal that is resistant to adhesive wear and an intermediate layer adapted thereto, said sliding-bearing composite material being very well suited, for example, to high-load applications as a bearing shell of a connecting rod bearing or of a main crankshaft bearing in an internal combustion engine, particularly in a supercharged diesel engine.

The inventors have determined that, because of the casting method, intermetallic phases, particularly AlNiMn, but also AlCu precipitates and other NiMn precipitates, form in the bearing metal layer and are present as hard particles finely distributed in the aluminum matrix in addition to the soft phase of tin and the microalloying elements V and optionally Zr and Ti. The form of the hard particles changes only slightly after the casting as a result of the subsequent heat treatment, and therefore the particle size and particle distribution in the matrix are set primarily by means of the cooling rate in the casting process in order to thereby achieve the desired material properties, particularly the fatigue strength. The microalloying elements V and optionally Zr and Ti increase the recrystallization temperature and prevent grain growth in the material, ensuring unchangingly good material properties in applications in an elevated temperature range, particularly at temperatures in the range of 150 to 200° C. Therefore, the particle size and particle distribution of the tribologically active particles (hard particles and soft phase) in the matrix are optimized with regard to high-load applications by means of the combination of the composition according to the invention, including the microalloying elements, and the special method steps.

The inventors have found that the bearing metal layer can be designed with considerably increased fatigue strength than was common in the prior art because of the specific choice of the zinc content in combination with adapted microalloying elements, particularly if a ductile intermediate layer is used. Therefore, the bearing is suitable not only in the main bearing region, where mixed friction conditions occur increasedly in start-stop operation, under which conditions there is no (hydrodynamic) oil lubrication of the bearing, but also as a connecting rod bearing material.

Regardless of suitable temperature control and suitable degrees of deformation in the production of the sliding-bearing composite material, the addition of Ti improves the microstructure of the matrix material in the casting process. By exactly adhering to the Ti content of 0.02-0.2 wt %, preferably 0.04-0.1 wt %, an adequately fine grain size of the Al matrix material ensuring high strength and good elongation properties of the matrix material can be established at the cooling rates of the casting process that are aimed for with regard to the particle size distribution of the intermetallic phases. The grain size distribution of the matrix material, in turn, influences both the distribution of the intermetallic phases and the embedding of the soft phase, i.e., the insoluble Sn, along the grain boundaries. Therefore, the Ti content must be coordinated as exactly as possible with the percentage of the Ni, Mn, Cu, and Sn content.

According to the invention, the latter lies in a range of 6.0 wt % to 8.0 wt %. Precisely in said range, the alloy system of the bearing metal layer has the excellent sliding properties and, because of a comparatively low content of tin as a soft phase, has the necessary strength for high loads, which makes use under mixed friction conditions possible.

Copper contents in the range of 0.5-1.0 wt % are preferably added to increase the strength of the aluminum matrix without reducing the elongation too greatly.

The Cr content must be considered in relation to the Cu content. Both elements have proven especially important in the aluminum matrix in respect of the resistance of the material to high temperatures. The resistance to high temperatures is always required in high-load applications. The Cr content of 0.16 to 0.25 wt % has proven favorable for forming sufficiently strength-increasing precipitates in the matrix when Cu is also added at a content of 0.5 to 1.0 wt %. On the other hand, a content of 0.25 wt % Cr and 1.0 wt % Cu should not be exceeded so that the formability is not impaired. Finally, the combination of Cr and Cu also has a positive effect in that an upper limit of the Cu used of 1.0 wt % lowers the costs and increases the recyclability of the material.

The vanadium, in a percentage of 0.1-0.3 wt %, inhibits recrystallization, because the vanadium raises the recrystallization temperature of the matrix material. Therefore, vanadium serves to increase the resistance to high temperatures, and this, in conjunction with the titanium, allows a grain size matched to the soft phase and to the intermetallic precipitates to be set more easily.

Furthermore, the addition of vanadium, in conjunction with a relatively low tin content of 6-8 wt %, causes a significant strength increase, particularly an increase in the 0.2% yield point $R_{p,\,0.2}$ to preferably more than 90 MPa and an increase in the tensile strength $R_m$ to preferably more than 145 MPa. The material parameters have been determined at room temperature in the tensile test as per DIN EN ISO 8892-1. The astonishing aspect is that this significant change occurs at small percentages of 0.2 wt % vanadium and in the case of a small reduction in the degree of tin, for example from 10 wt % to 7 wt %, i.e., within a small range.

The intermediate layer of the sliding bearing element rolled to a final size preferably has a thickness $d_2$ of 20 µm to 50 µm.

The intermediate layer preferably has a microhardness of 70 HV 0.01 to 110 HV 0.01 and preferably 85 HV 0.01 to 100 HV 0.01.

The hardness test according to Vickers is performed on the intermediate layer of the finished (shaped) sliding bearing element in accordance with the European Standard EN 6507-1. The testing tip (the indenter) is pressed, in the plane direction of the intermediate layer, into the intermediate layer in the region of a prepared cut edge of the sliding bearing element. The cut edge is preferably prepared by means of grinding.

The hardness and the thickness of the intermediate layer are directly related and require functional coordination with previously mentioned properties of the bearing metal layer. The microhardness, in conjunction with the layer thickness of the intermediate layer, can be set on the basis of the composition of the aluminum alloy having the obligatory constituents 3.5 to 4.5 wt % copper, 0.1 to 1.5 wt %, preferably 0.4 to 1.0 wt %, manganese, 0.1 to 1.5 wt %, preferably 0.4 to 1.0 wt, magnesium, and the usual admissible impurities, the remainder being aluminum, particularly on the basis of the high copper content, without losses in the strength of the binding to the supporting layer, which preferably consists of steel. The setting occurs primarily by means of the roll plating operation.

The aluminum alloy of the intermediate layer optionally has 0.1 to 1.0 wt %, preferably 0.2 to 0.8 wt %.

Just like the manganese and the magnesium, the silicon leads to a strength increase of the Al alloy.

Furthermore, the aluminum alloy of the intermediate layer preferably has 0.05 to 1.0 wt % iron, 0.05 to 0.5 wt % chromium, and 0.05 to 0.5 wt % zinc.

Optionally 0.05 wt % to 0.25 wt % zirconium and titanium in total, and optionally other alloy constituents, which, however, make up not more than 0.1 wt % of the alloy individually and not more than 0.25 wt % of the alloy in total.

Particularly in especially high-load bearing applications in internal combustion engines, a polymer-based sliding layer is especially preferably arranged on the bearing metal layer.

The polymer layer results in a more even load distribution over the entire bearing width, particularly in the case of high loads. Because of the elastic and plastic adaptation capability of the polymer layer, the operational reliability of the whole bearing can be increased further.

The bearing metal layer especially preferably has a thickness of 200 µm-400 µm.

Furthermore, the bearing metal layer preferably has a Brinell hardness of 50-60 HBW 1/5/30.

Furthermore, the invention relates to a sliding bearing element composed of a sliding-bearing material of the type described above, which sliding bearing element can be, in particular, a bearing shell, a sliding bearing bush, or a thrust washer.

Accordingly, one aspect of the invention is the use of the sliding-bearing composite material of the type described above for sliding bearing elements, particularly sliding bearing shells, sliding bearing bushes, or thrust washers.

THE DRAWINGS

Further features of the invention are explained in more detail below on the basis of the figures.

DETAILED DESCRIPTION

Figure 1:
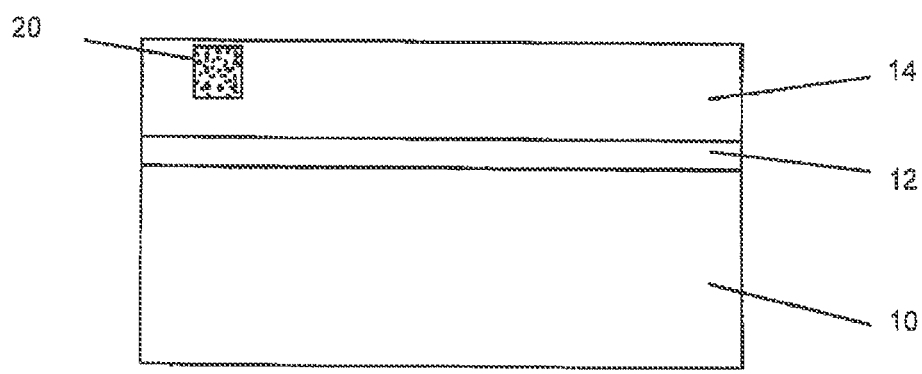
FIG. 1 shows a schematic layer structure of a first embodiment of the sliding-bearing composite material according to the invention.

FIG. 1 shows a schematic illustration of a cross-section through a sliding-bearing composite material according to a first embodiment of the invention, it shows three layers in total. A supporting layer 10 composed of steel, which ensures the required press fit of the bearing element because of the stiffness of said supporting layer, is shown as a lower layer in FIG. 1. An intermediate layer 12 having the aluminum-based composition according to the claims is arranged directly on the supporting layer 10. The intermediate layer serves as an adhesion promoter between the steel layer 10 and the bearing metal layer 14 arranged on the intermediate layer 12. The bearing metal layer 14 has, for example, the following composition:

6 to 8 wt % tin, 1 to 3 wt % nickel, 0.5-1 wt % copper, 0.5-1 wt % manganese, 0.2 wt % vanadium, 0.2 wt % chromium, and 0.2 wt % zirconium, the remainder being copper.

Figure 3:
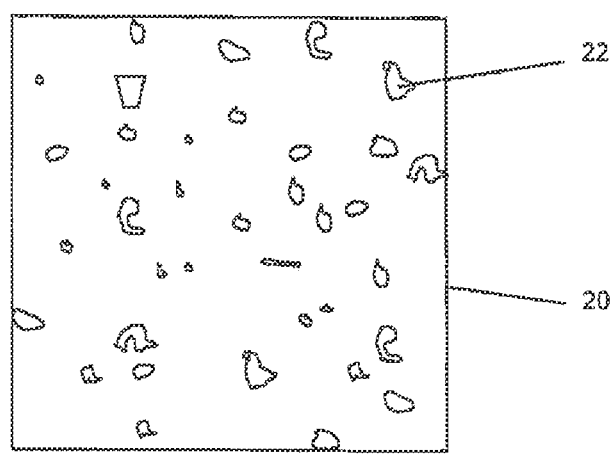
FIG. 3 shows a magnified detail of the bearing metal layer.

Furthermore, an area detail 20, which, under magnification, has the internal structure illustrated in FIG. 3, is presented symbolically in FIG. 1. To create an image of such an area detail, a flat metallographic section is preferably prepared in a suitable location of the bearing metal layer. In deviation from the illustration in FIG. 1, the area detail can also be examined perpendicularly to the plane of illustration, e.g., parallel to the sliding surface. The layer thickness of the intermediate layer in the sliding-bearing composite material according to the invention is preferably 20 µm to 50 µm.

Furthermore, the grain size distribution of the matrix material promotes the homogeneity of the distribution of the Ni—Mn precipitates, particularly the Al—Ni—Mn precipitates, and the Al—Cu precipitates along the grain boundaries of the matrix. These intermetallic phases form hard particles in the microstructure of the bearing metal layer.

Figure 2:
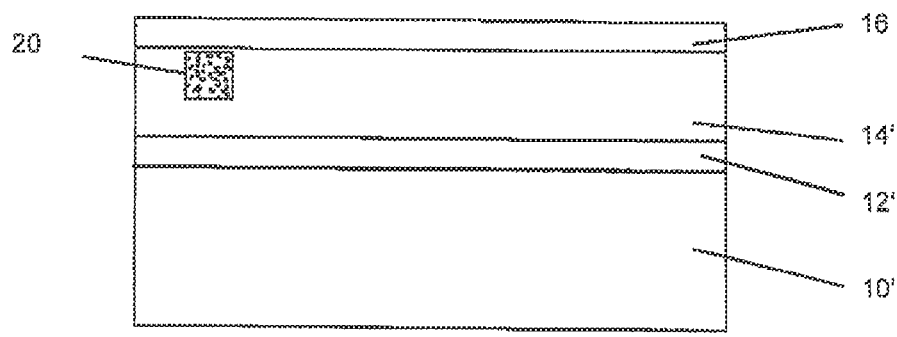
FIG. 2 shows a schematic layer structure of a second embodiment of the sliding-bearing composite material according to the invention.

The second embodiment according to FIG. 2 has the same layer structure in the range of the steel supporting layer 10, the intermediate layer 12, and the bearing metal layer 14. In addition, a polymer coating is applied to the bearing metal layer 14 as a sliding layer 16, which is advantageous particularly in high-load bearing applications.

The procedure for determining the intermetallic precipitates in the bearing metal layer is explained below on the basis of FIG. 3. After a flat areal microsection of the bearing metal layer extending, for example, perpendicularly to the sliding surface has first been prepared, an area detail 20 of the bearing metal layer having a certain edge length and edge width is selected and marked under a microscope, for example at 500× magnification, such as a rectangle having edge lengths of 500 µm and 800 µm, i.e., the measurement area of 400,000 µm$^2$. In said area detail, one can see a large number of intermetallic NiMn, particularly AlNiMn, and AlCu phases 22, which, according to the invention, can be optically distinguished from other inclusions, particularly from the soft phase, and also from foreign particles, both not shown here, and from the Al matrix by means of a certain gray value range or color value range. The sensing of such phases is preferably performed in an automated manner in an electronic image recording system.

The invention claimed is:

1. A sliding-bearing composite material, comprising a supporting layer including steel, an intermediate layer based on an aluminium alloy that is free of lead except for impurities, and a bearing metal layer based on an aluminium alloy that is free of lead except for impurities, wherein the aluminium alloy of the intermediate layer has a composition having, based on the total weight of the aluminium alloy of the intermediate layer, 3.5 to 4.5 wt % copper,
0.1 to 1.5 wt % manganese,
0.1 to 1.5 wt % magnesium,
optionally silicon, the silicon ranging from 0.1 to 1.0 wt % if present,
optionally iron, the iron ranging from 0.05 to 1.0 wt % if present,
optionally chromium, the chromium ranging from 0.05 to 0.5 wt % if present,
optionally zirconium and/or titanium, the zirconium and/or titanium ranging from 0.05 to 0.25 wt % in total if present,
optionally other alloy constituents other than the impurities, the other alloy constituents in an amount of not more than 0.1 wt % individually if present and not more than 0.25 wt % in total of if present,
and the impurities, the remainder being aluminium,
and wherein the aluminium alloy of the bearing metal layer has a composition having, based on the total weight of the aluminium alloy of the bearing metal layer, 6.0-8.0 wt % tin,
1.0-3.0 wt % nickel,
0.5-1.0 wt % manganese,
0.5-1.0 wt % copper,
0.15-0.25 wt % chromium,
0.1-0.3 wt % vanadium,
optionally zirconium, the zirconium ranging from 0.1-0.2 wt % if present, optionally titanium, the titanium in an amount of up to 0.2 wt % if present,
optionally other elements other than the impurities, the other elements in an amount of less than 0.5 wt % of other elements if present,
and the impurities,
the remainder being aluminium.

2. The sliding-bearing composite material according to claim 1, wherein the intermediate layer has a thickness (d2) of 20 μm to 50 μm.

3. The sliding-bearing composite material according to claim 1, wherein the intermediate layer, joined to the bearing metal layer, is applied to the supporting layer in a roll plating method at plating temperatures of <300° C.

4. The sliding-bearing composite material according to claim 1, wherein the intermediate layer has a microhardness of 70 HV 0.01 to 110 HV 0.01.

5. The sliding-bearing composite material according to claim 1, wherein the aluminium alloy of the intermediate layer has, in weight percent:

| | |
|---|---|
| Manganese | 0.4% to 1.0% |
| Magnesium | 0.4% to 1.0% |
| Silicon | 0.2% to 0.8%. |

6. The sliding-bearing composite material according to claim 1, wherein the aluminium alloy of the bearing metal layer has a 0.2% yield point ($R_{p,\,0.2}$) of more than 90 MPa and a tensile strength of more than 145 MPa.

7. The sliding-bearing composite material according to claim 1, wherein the bearing metal layer has a thickness (d) of 200 μm to 400 μm.

8. The sliding-bearing composite material according to claim 1, wherein a polymer-based sliding layer is arranged on the bearing metal layer.

9. A sliding bearing element composed of a sliding-bearing composite material according to claim 1, wherein the sliding bearing element is a bearing shell, a sliding bearing bush, or a thrust washer.

* * * * *